United States Patent
August et al.

(12)

(10) Patent No.: US 6,784,923 B1
(45) Date of Patent: Aug. 31, 2004

(54) DIVERSITY AND ADAPTIVE ANTENNA ARRANGEMENTS FOR INDUCTIVE PICK-UPS

(75) Inventors: Katherine Grace August, Matawan, NJ (US); Robert Duchatellier, Atlantic Highlands, NJ (US); Norman R. Shaer, Freehold, NJ (US); Theodore Sizer, II, Little Silver, NJ (US)

(73) Assignee: Agere Systems Inc., Allentown, PA (US)

(*) Notice: Subject to any disclaimer, the term of this patent is extended or adjusted under 35 U.S.C. 154(b) by 611 days.

(21) Appl. No.: 09/667,313

(22) Filed: Sep. 22, 2000

(51) Int. Cl.[7] ..................... H04N 17/00; H04N 17/02
(52) U.S. Cl. ..................... 348/180; 348/460; 348/553
(58) Field of Search ............................... 348/553, 552, 348/571, 460, 180, 705, 706; 725/72, 131, 139, 151; H04N 11/00, 7/00, 5/44, 17/00, 17/02

(56) References Cited

U.S. PATENT DOCUMENTS

| | | | | | |
|---|---|---|---|---|---|
| 5,335,010 | A | * | 8/1994 | Lindemeier et al. | 348/706 |
| 5,710,995 | A | * | 1/1998 | Akaiwa et al. | 455/277.2 |
| 5,777,693 | A | * | 7/1998 | Kishigami et al. | 348/731 |
| 5,818,543 | A | * | 10/1998 | Lee | 348/725 |
| 6,188,447 | B1 | * | 2/2001 | Rudolph et al. | 348/729 |
| 6,577,353 | B1 | * | 6/2003 | Welles et al. | 348/706 |
| 6,603,961 | B1 | * | 8/2003 | Kuroda | 455/133 |

* cited by examiner

Primary Examiner—Michael H. Lee
Assistant Examiner—Trang U. Tran (57) ABSTRACT

The present invention provides for inductive pick-up devices employing a diversity and adaptive antenna arrangement. By utilizing diversity and adaptive antennas, the pick-up can be installed by a consumer without use of a computer monitor or other device to determine alignment. In addition, the arrangement increases the level of signal available to a data decoding system. In combining the two types of pick-ups and using the best features of both, we additionally gain performance on synchronizing frame rate and picking up data.

3 Claims, 9 Drawing Sheets

DIVERSITY AND ADAPTIVE ANTENNA ARRANGEMENTS FOR INDUCTIVE PICK-UPS

FIELD OF THE INVENTION

The invention relates generally to inductive pick-up devices and, more particularly, to inductive pick-up devices employing diversity and adaptive antenna arrangements.

BACKGROUND OF THE INVENTION

Inductive pick-ups are currently being used to provide frame rate synchronization to media monitoring systems (e.g., television and computer monitors) and for determining what watermark has been encoded into video content thereby identifying the program source. Such pick-ups come in two varieties: (i) one picks up the video noise generated by the electron guns of the monitor; and (ii) the other is installed in a position specifically determined to have the best signal for intercepting the intermediate radio frequency signal, typically at about 44 Megahertz (MHZ). The best position to detect this frequency is not always the same location and, therefore, the position of the pick-up with respect to the monitor needs to be optimized manually.

Advantages to locating a pick-up on the back of the monitor include: (i) higher signal level for detection and interpretation of in-content video encoding or watermarking; (ii) ease of installation; (iii) low cost. However, a disadvantage is that the pick-up located on the back of the monitor detects little of the intermediate frequency.

An advantage to locating a pick-up on the underside of the monitor is that the pick-up receives the intermediate frequency and thereby includes both audio and video, as well as the vertical blanking interval. One problem associated with antennas of this type includes the complexity of installation in an appropriate location so as to get a sufficient signal for detecting data or a watermark.

Conventional systems require a trained expert to select a position near the monitor, evaluate the signal received and determine the best location for the antenna so that a high quality signal can be received. Since there is a high degree of variation among monitors, there is no specific location that is best suited to receive a signal from every monitor.

Therefore, there is a need for an improved inductive pick-up arrangement which at least substantially eliminates the need to manually optimize the pick-up location with respect to the monitor, thus obviating the need for a trained expert to position the pick-up.

SUMMARY OF THE INVENTION

The present invention provides for inductive pick-up devices employing diversity and adaptive antenna arrangements. By utilizing diversity and/or adaptive antennas, as will be explained, the pick-up can be installed by a consumer without use of a computer monitor or other device to determine alignment. In addition, the arrangements described herein increase the level of signal available to a data decoding system.

Thus, one important purpose of creating such an antenna array in accordance with the invention is to reduce the expertise required to obtain a satisfactory signal from outside a device, such as a television, such that a data stream encoded into the video may be decoded easily, inexpensively, and without risk of capturing the wrong signal from a programming transmission, that is, a transmission that is not currently being viewed by a consumer.

Separate diversity antenna arrangements may be employed, as well as separate adaptive antenna arrangements. In one preferred embodiment, a pick-up arrangement employ both diversity and adaptive antennas is used. In combining the two types of antenna arrays in a pick-up and using the best features of both, we additionally gain performance on synchronizing frame rate and picking up data.

In accordance with one aspect of the invention, a predetermined number of antennas are arranged in a single pick-up device. In one embodiment, the arrangement may comprise four antennas. Each of the predetermined number of antennas pick up a signal from the environment. In the case of the diversity antenna arrangement, the system continually samples the signal received by each antenna and switches data collection functions to the antenna receiving the signal determined to be the best. In the case of the adaptive antenna arrangement, signals received by each of the antennas are added together to provide a more robust signal for data collection and processing. As mentioned, in one embodiment, both a diversity approach and an adaptive approach are employed together. It is to be appreciated that these approaches can be used for either of the pick-up devices described above, i.e., (i) one that picks up the video noise generated by the electron guns of the monitor; and (ii) the other that intercepts the intermediate radio frequency signal.

Advantageously, a pick-up formed according to the present invention substantially eliminates the most significant problem encountered when using a conventional pick-up, i.e., being required to have the pick-up installed in an optimal location by a skilled person.

It is to be further appreciated that more than one pick-up arrangement may be placed around the display device being monitored. A pick-up on the back of the monitor provides a better level of signal from which the video encoded watermark or data can be decoded, however, the vertical blanking interval is not as easy to detect. By using the pick-up under the monitor to correct and synchronize the timing elements associated with decoding sequences, we improve the system's ability to provide more and more accurate bits from the video stream. By combining a pick-up under the monitor with a pick-up on the sloping back of the monitor, for example, we substantially improve the throughput of the data captured for any number of applications.

Applications may, for example, include: proof of performance, data delivery, program ratings, direct response, system control. However, the invention is not limited to any particular application.

In an embodiment where the present invention is employed in accordance with a television monitor having a set top box associated therewith, the data captured and decoded by an antenna array arrangement of the invention may be compared to the data decoded by the set top box. If the decoded data is different, then the data captured and decoded by the antenna array arrangement is used by the application. Otherwise, the set top box decoded data is used.

The performance of a system according to the invention is especially significant in a digital television environment. In the digital television environment, information encoded into the vertical blanking intervals will not be available to such monitoring systems. As many as six video streams can be broadcast on the same channel, so determining viewer content becomes impossible without reliable inductive pick-ups when access to the data stream has not been provided directly by television equipment manufacturers.

These and other objects, features and advantages of the present invention will become apparent from the following

DETAILED DESCRIPTION OF PREFERRED EMBODIMENTS

The following description will illustrate the invention using various embodiments of inductive pick-up devices according to the invention and various placements of such devices in particular positions with respect to a television monitor. It should be understood, however, that the invention is not limited to use with a particular monitor or placement as shown in these illustrative embodiments. The invention is instead more generally applicable to any monitoring system in which it is desirable to substantially eliminate the need to manually optimize the pick-up location with respect to the monitor and thus obviate the need for a trained expert to position the pick-up. In accordance with such an improved pick-up device of the invention, the device may be placed in a variety of locations with respect to a monitor in order to perform one or more of the operations described herein.

Figure 1:
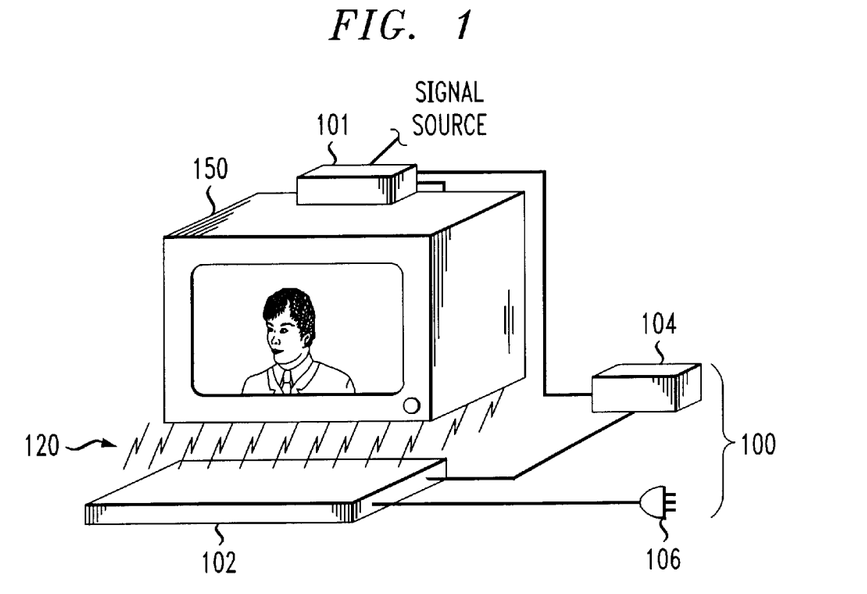
FIG. 1 is a diagram illustrating an inductive pick-up device according to an embodiment of the present invention and an exemplary placement of the pick-up with respect to a television monitor.

Referring initially to FIG. 1, a diagram is shown illustrating an inductive pick-up device 100 according to one embodiment of the present invention, and placement thereof with respect to a television monitor 150. Also, as shown, the television monitor has a set top box 101 coupled thereto for receiving and processing the television signal transmitted by a signal source, e.g., cable television service providers, broadcast networks, etc. The external view of the pick-up device 100 illustrates a section 102 which contains antennas 1, 2, . . . , N, as will be explained in detail below. In this particular embodiment, the section 102 is shaped in the form of a mat-like structure. Of course, other suitable shapes may be employed. Nonetheless, the remainder of the detailed description of the invention refers to a portion of the pick-up device or the entire pick-up device as "antenna mat." However, such a reference is intended for ease of discussion and is not intended to be limiting in any way.

The view of the device 100 also illustrates a section 104 coupled to the section 102 and the set top box 101. Section 104 preferably contains the components associated with the device other than the antennas, as will be explained below in the context of the subsequent drawings. A power connector 106 for providing power to the device 100 is also shown. In this particular arrangement, the mat-like antenna section 102 is placed under the television monitor 150 in order to detect a signal received by the monitor. Particularly, the antennas of the mat section 102 are responsive to the signals radiated from the television monitor 150. Such radiated noise signals are represented as lines 120 in FIG. 1. These radiated signals are actually the information signals that correspond to the content that is currently being displayed on the television monitor.

As is know, if picked up effectively from the emissions radiated by the monitor, such information signals may be decoded to provide a representation of the content of the signal being viewed by the user of the monitor. Unfortunately, as explained above with respect to conventional pick-ups, proper placement of a pick-up is not something reasonably within the scope of ability of the average viewer. However, the antenna array arrangements of the invention substantially eliminate this problem, as well as other problems.

While the mat section 102 is shown as being placed at some distance under the monitor 150 (e.g., on a shelf underneath the shelf supporting the monitor), it is to be appreciated that the monitor may rest directly on the mat section 102. As previously mentioned, the device may alternatively be placed behind the monitor, above the monitor, or at any other suitable location with respect to the monitor. Also, more than one such device may be placed around the monitor.

Figure 2:
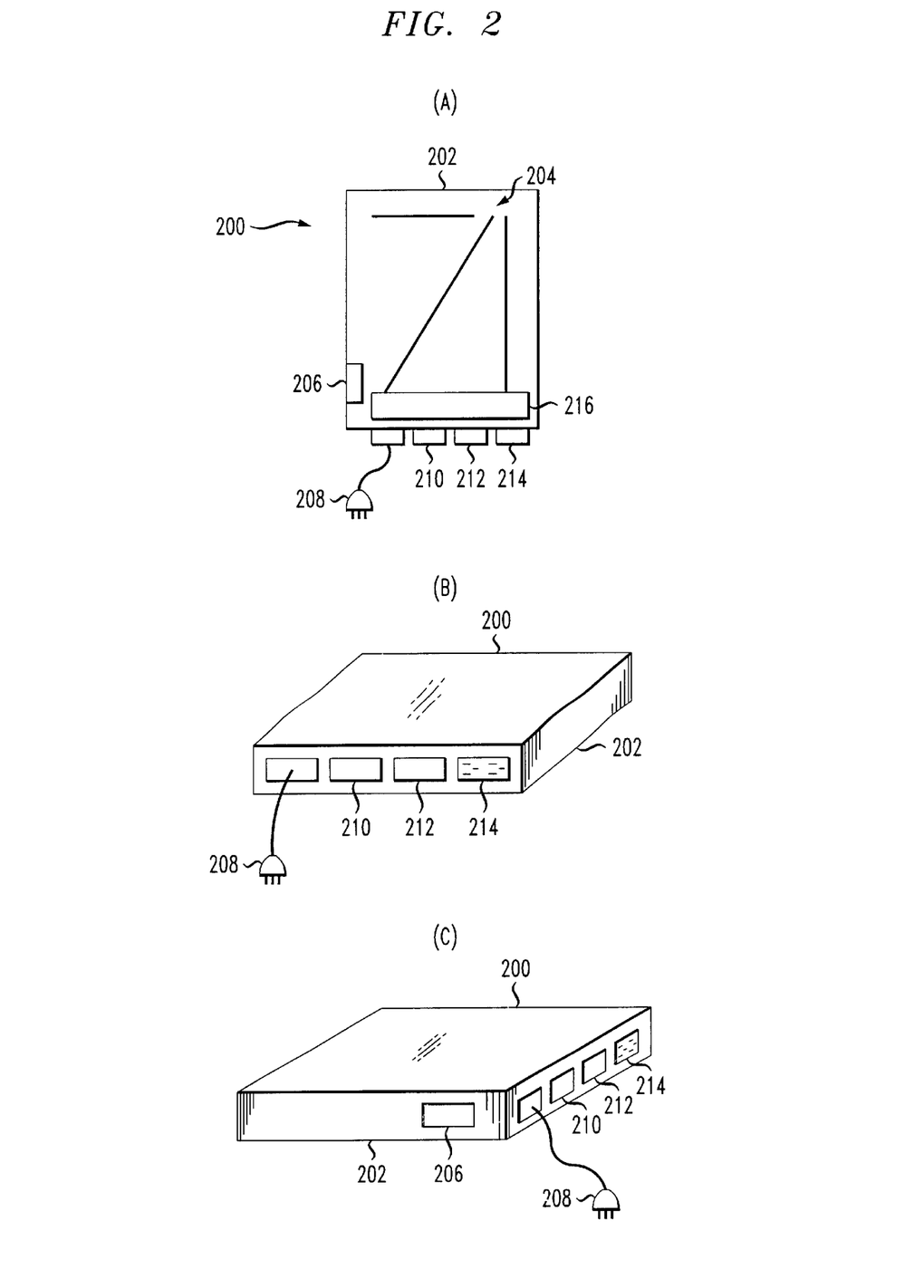
FIG. 2A is a top plan view of an inductive pick-up device according to another embodiment of the present invention.
FIG. 2B is a side perspective view of an inductive pick-up device according to another embodiment of the present invention.
FIG. 2C is a front perspective view of an inductive pick-up device according to another embodiment of the present invention.

Referring now to FIGS. 2A through 2C, various views are shown of an inductive pick-up device 200 according to another embodiment of the present invention. Particularly, FIG. 2A is a top plan view, FIG. 2B is a side perspective view and FIG. 2C is a front perspective view. In the embodiment of FIGS. 2A through 2C, all components of the device are located internal to the device. As shown, the device comprises mat-like housing 202, antennas 204, an infrared transceiver 206, a power connector 208, an RJ-11 connector 210, an output connector 212 and a connector 214 for a plug-in surge protector. The internal electronic components of the device, e.g., processors, decoder, signal comparators and memory, as will be described in detail below, are depicted as block 216.

It is to be appreciated that the various mechanisms for connectivity of the device provide significant flexibility with respect to where the device may be located and to what the device may be in communication with or connected to. For instance, if the device is located in an entertainment center along with the televison to be monitored, other electronic units may be plugged into and powered through the device 200 via connector 214 which may have one or more power sockets. The device may provide surge protection to the other electronic units through these power connections. The device, itself, may be powered by plugging connector 208 into a wall outlet or other suitable power source. Of course, the device could also be self-powered, e.g., battery operated. Also, connectivity may be provided to other devices using the telephone/computer (e.g., RJ-11) connector, the output connector 212, and/or a wireless connection, such as the infrared transceiver 206. One or more of these connections may be used to receive data and/or transmit captured data to other devices including local or remote devices. An example of a local device is the set top box 101 (FIG. 1) associated with the television. Remote connection may be made to one or more applications through a modem in the device 200. The modem may be wireless (e.g., radio frequency connection) or wired (e.g., telephone connection).

It should be noted that the functional components of the inductive pick-up device of the invention (e.g., device 100 of FIG. 1 and device 200 in FIGS. 2A through 2C) may be implemented using one or more central processing units, microprocessors, application-specific integrated circuits, digital signal processors or other data processing devices. The central processing unit, microprocessor, application-specific integrated circuit, digital signal processor, or other data processing device may also have memory associated therewith for storing data and results associated with each component's function when necessary.

Figure 3:
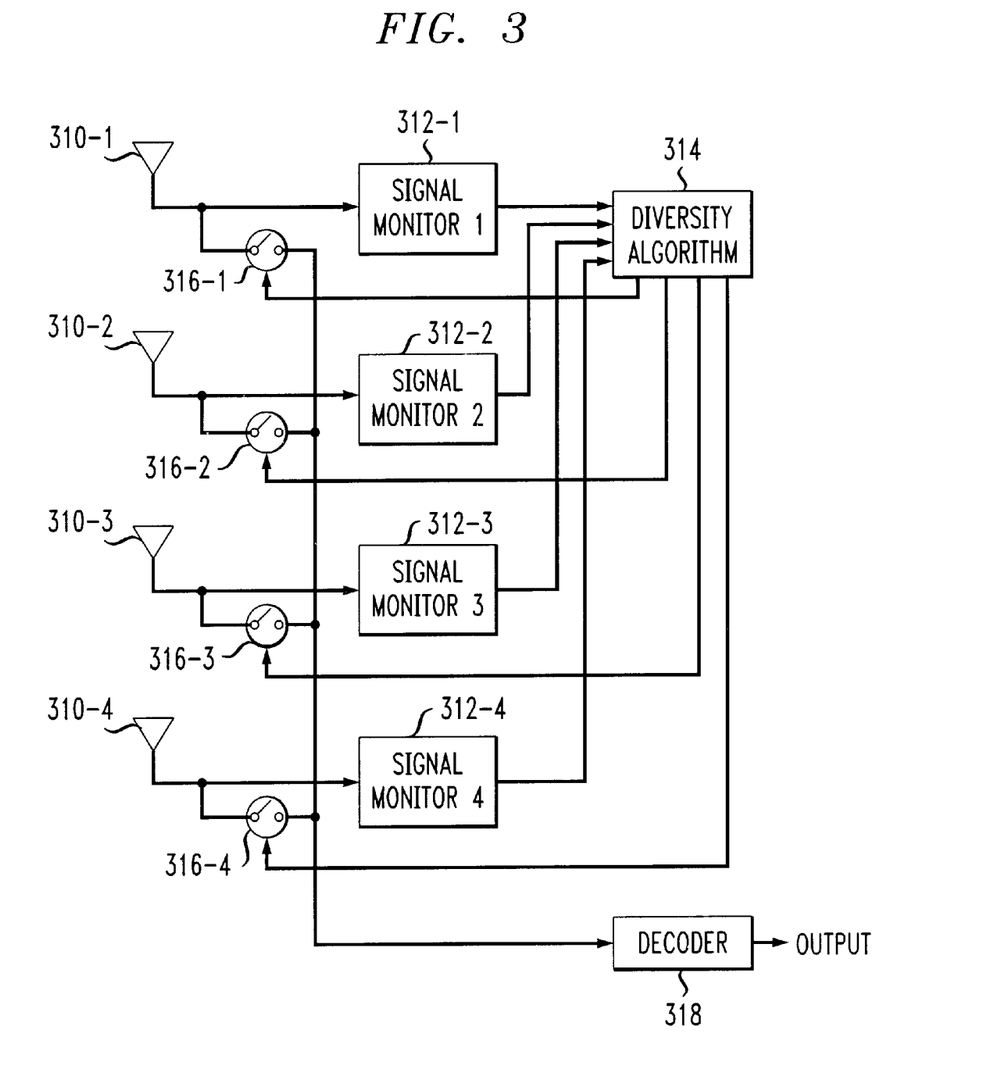
FIG. 3 is a block diagram of a diversity antenna array portion of an inductive pick-up device according to one embodiment of the present invention.

Referring to FIG. 3, a block diagram is shown of a diversity antenna array portion of an inductive pick-up device according to one embodiment of the present invention. The diversity antenna array is one design embodiment for an antenna mat architecture according to the invention. This design may be selected when the cost of implementation is a key element to the architecture. As previously mentioned, a key purpose of creating the antenna array is to reduce the expertise required to obtain a satisfactory signal from outside a device, such as a television, such that a data stream encoded into the video may be decoded easily, inexpensively, and without risk of capturing the wrong signal from a programming transmission, that is, a transmission that is not currently being viewed by a consumer. The desire to capture a signal representative of the transmission being viewed by the user is a function of the one or more applications with which the pick-up device is associated. Some illustrative applications will be described below.

In the illustration of FIG. 3, the device comprises four antennas 310-1 through 310-4 and respective circuitry in an arrangement that processes the signals of each antenna independently. Specifically, in addition to the antennas, the device comprises four respective signal monitors 312-1 through 312-4, a diversity algorithm module 314, four respective signal switches 316-1 through 316-4 and a decoder 318. While a set of four antennas and respective circuitry are shown in the illustration of FIG. 3, it is to be understood that more or less antennas and respective circuitry may be used.

The pick-up arrangement operates as follows. Each antenna, 310-1 through 310-4, independently receives emissions radiated from the television or monitor (e.g., lines 120 in FIG. 1). Each respective signal monitor, 312-1 through 312-4, independently detects an information signal in the emissions received by its associated antenna. The respective outputs of the signal monitors, i.e., the detected information signals, are provided to the diversity algorithm module 314. A diversity algorithm executed by the module 314 analyzes the signal received from each antenna. Any suitable diversity algorithm may be employed. One example of a diversity algorithm that may be employed is described in "Microwave Mobile Communications," William Jakes, ed., Wiley & Sons, pp. 329+, 1974, the disclosure of which is incorporated by reference herein.

Once the signal from one antenna exceeds the quality of the signal from all other antenna for a prescribed period of time, module 314 causes the switch (316-1 through 316-4) associated with that antenna to close, thereby connecting the signal from that antenna with the decoder 318. The decoder decodes the signal, as is known in the art, to yield a decoded output. The decoded output is preferably subjected to a signal comparator (not shown in FIG. 3) and then, depending on the results of the comparison between the decoded antenna mat data and another data source, sent to an application processor (also not shown in FIG. 3). The signal comparator and application processor operations will be explained in detail below in the context of FIGS. 5A–9.

Figure 4:
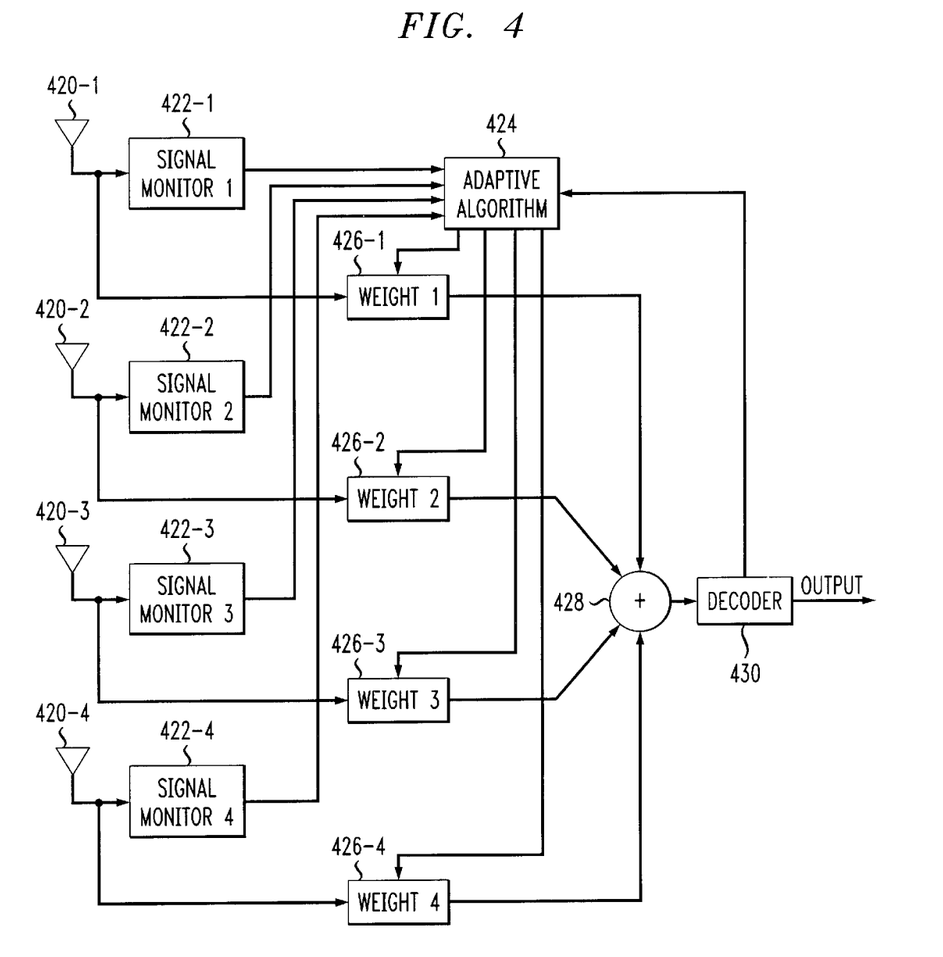
FIG. 4 is a block diagram of an adaptive antenna array portion of an inductive pick-up device according to one embodiment of the present invention.

Referring now to FIG. 4, a block diagram is shown of an adaptive antenna array portion of an inductive pick-up device according to one embodiment of the present invention. The adaptive antenna array is an alternative design for the antenna mat architecture. This design implementation allows for the more expensive features of the weighting functions associated with the adaptive algorithm.

In the illustration of FIG. 4, the device comprises four antennas 420-1 through 420-4 and respective circuitry in an arrangement that processes the signals of each antenna independently. Specifically, in addition to the antennas, the device comprises four respective signal monitors 422-1 through 422-4, an adaptive algorithm module 424, four respective weighting function modules 426-1 through 426-4, a signal adder 428 and a decoder 430. Again, while a set of four antennas and respective circuitry are shown in the illustration of FIG. 4, it is to be understood that more or less antennas and respective circuitry may be used.

The pick-up arrangement operates as follows. Each antenna, 420-1 through 420-4, independently receives emissions radiated from the television or monitor (e.g., lines 120 in FIG. 1). Each respective signal monitor, 422-1 through 422-4, independently detects an information signal in the emissions received by its associated antenna. The respective outputs of the signal monitors, i.e., the detected information signals, are provided to the adaptive algorithm module 424. An adaptive algorithm executed by the module 424 analyzes the signal received from each antenna. Any suitable adaptive algorithm may be employed. One example of an adaptive algorithm that may be employed is described in "Mobile Cellular Telecommunications," William Lee, McGraw-Hill, pp. 571+, 1995, the disclosure of which is incorporated by reference herein.

The adaptive algorithm evaluates the quality of the signal received from each of the antenna. The adaptive algorithm then accordingly adjusts the percentage of the signal from each antenna that is to be included in the stream sent to the decoder based on the evaluated quality of the signal. This is accomplished by the module 424 adjusting the weighting function associated with each of the weighting function modules 426-1 through 426-4. The adjusted signals output by the weighting function modules are added by the signal adder 428 to form a composite signal. The composite signal is then provided to the decoder 430. The decoder decodes the signal, as is known in the art, to yield a decoded output. The decoded output is preferably provided back to the adaptive algorithm module 424 so that the decoder function can be used as feedback for the adaptive algorithm. Again, the decoded output is preferably subjected to a signal comparator (not shown in FIG. 4) and then, depending on the results of the comparison between the decoded antenna mat data and another data source, sent to an application processor (also not shown in FIG. 4). Again, the signal comparator and application processor operations will be explained in detail below in the context of FIGS. 5A–9.

It is to be appreciated that in a preferred embodiment, the diversity approach and the adaptive approach may be combined in a single antenna mat architecture. In such a case, the same four antennas and signal monitors (or other predetermined number of antennas and signal monitors) may be commonly used by the other diversity array circuitry (i.e., diversity algorithm module, switches) and the other adaptive array circuitry (i.e., weighting function modules, adaptive algorithm module and signal adder). The decoder may then receive a signal from the diversity antenna portion of the device and a signal from the adaptive antenna portion of the device. The decoder then makes a determination as to the better of the two signals based on some criteria, e.g., signal-to-noise ratio, and decodes the selected signal. One of ordinary skill in the art will realize that to implement the combined diversity/adaptive approach, all that must be done is to functionally combine the elements of FIGS. 3 and 4 as explained above.

Once an information signal is captured and decoded by the pick-up device using one of the techniques described above, the decoded data may be used in one or more applications, contingent on a comparison with a decoded version of the original video stream received from the signal source by the set top box (101 in FIG.1). These operations as well as the use of the decoded data in the context of some illustrative applications will now be explained with reference back to FIG. 1 and to FIGS. 5A–9.

Figure 5A:
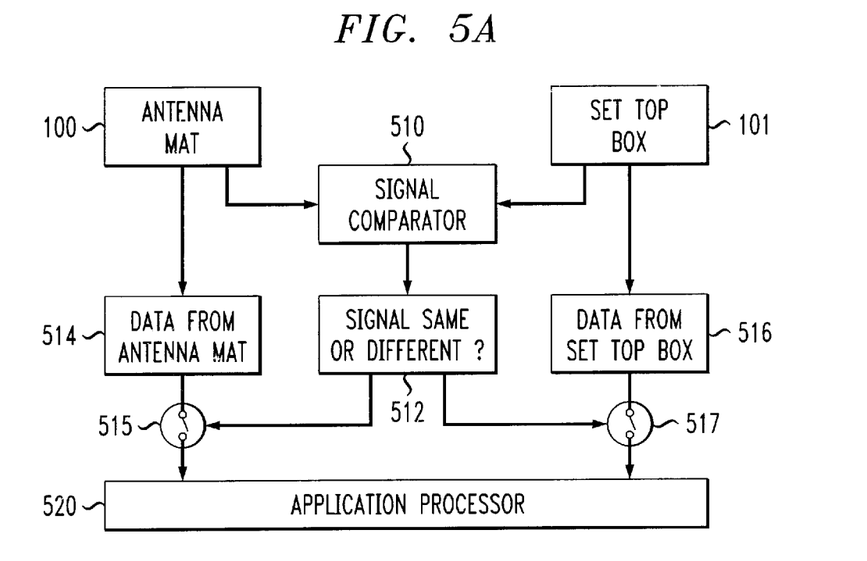
FIG. 5A is a flow diagram illustrating real-time data flow of decoded data before it is provided to a particular application.

Referring now to FIG. 5A, a flow diagram is shown illustrating the data flow of decoded data before it is provided to a particular application. As explained above, the antenna mat 100 is positioned on, under, or on the sloping back of the video display 150 and the decoding capabilities of the antenna mat decode the output of the video display, i.e., the radiated information signal representative of the transmission displayed on the television monitor.

As is known, a set top box 101 is used to provide certain advanced features for video content viewing or associated functions including but not limited to: pay-per-view, on-screen viewing of programming content schedule, web site address and other information delivery, and on screen display of details describing currently viewed programming. The television monitor 150 may be cable ready, or not.

The video stream is processed by the set top box, as is known. The video stream contains encoded data which may have been encoded in any number of ways including, for example, but not limited to: Vertical Blanking Interval, MediaTraX, or other watermarking techniques. The video stream may alternatively be encoded in accordance with the techniques described in U.S. Pat. No. 5,929,920 issued to Sizer on Jul. 27, 1999 and entitled "System and Method for Encoding Digital Information in a Television," the disclosure of which is incorporated by reference herein. However, various other encoding techniques may be employed. In any case, the decoding capabilities of the set top box, corresponding to the encoding technique employed, process the video stream and extract encoded data. It is to be appreciated that the same decoding techniques may be used in the decoder of the antenna mat, however, this is not required.

One or more data capture verification techniques may be used to verify accuracy of data captured including, for example, but not limited to: forward error correction, reference tables, previously captured data, etc., for both the set top box and the antenna mat.

A signal comparator 510 then compares decoded data retrieved from set top box 101 with decoded data retrieved from the antenna mat 100. The signal comparator may reside with the other components of the pick-up in section 104, in the set top box 101 or in some other system coupled to the pick-up and/or set top box. As shown in FIG. 1, there is a connection between the antenna mat (section 104) and the set top box 101. Based on the comparison, it is determined whether or not the two signals are the same, i.e., equal, or different, i.e., unequal (step 512).

If the decoded data 514 from the antenna mat is equal to the decoded data 516 from the set top box, then the data stream from the set top box is provided to an application processor 520 via switch 517. The application processor is a processor which utilizes the decoded data in accordance with one or more applications. Equal is defined so as to accommodate for minor fluctuations in the decoding of data through either method. Data is not considered to be different until it is different for some predefined period of time, such as would provide a sample of data packets for the processor to evaluate. In this way, we avoid hysteresis. If the data from the set top box is not equal to the data from the antennae mat for some pre-determined time interval, then the data decoded from the antenna mat is sent to the application processor via switch 515 and utilized by the application. The switches 515 and 517 may reside with the signal comparator 510.

The rationale for using the decoded data from the antenna mat when there is a difference between the data decoded by the set top box and data decoded by the antenna mat is based on the assumption that the data decoded by the antenna mat more closely represents the data currently being viewed by the user on the display. However, if the signal comparator determines that the decoded signals are the same, then it is preferable to use the actual decoded video stream from the set top box since it represents the viewable content and is more likely to be a cleaner signal.

Depending on the result of the comparison, decoded data from the antenna mat or the set top box is passed to the application processor 520. It is to be appreciated that the application processor may be in the set top box, in the antennae mat (e.g., section 104), in the display equipment, in a computer, or in another specialty device. For illustration, the application processor resides within the set top box equipment and can access other features and functions of the set top box. Therefore, the application features utilizing the data captured from the video may be fully integrated into the functions of the set top box. In the case where an antenna mat according to the invention is added to the existing architecture, the application processor in the antenna mat may have additional features that enhance the viewer's experience in a similar manner to a set top box without requiring programming changes to the set top box or television equipment.

It is to be appreciated that the data flow arrangement in FIG. 5A may be considered an on-line or real-time data flow arrangement. Alternatively, FIG. 5B may be considered as illustrating an off-line data flow arrangement. Data with errors may be passed through with either method, however, one assumes that the application is more vulnerable to errors in real-time data processing techniques than with off-line data processing techniques. This is because, with the real-time path, unadjusted decoded data is always sent through to the application processor until, for example, a threshold is exceeded for a period of time. This is due to the fact that one of the switches 515 or 517 is always closed so that the application will always have input data during real-time operations.

Figure 5B:
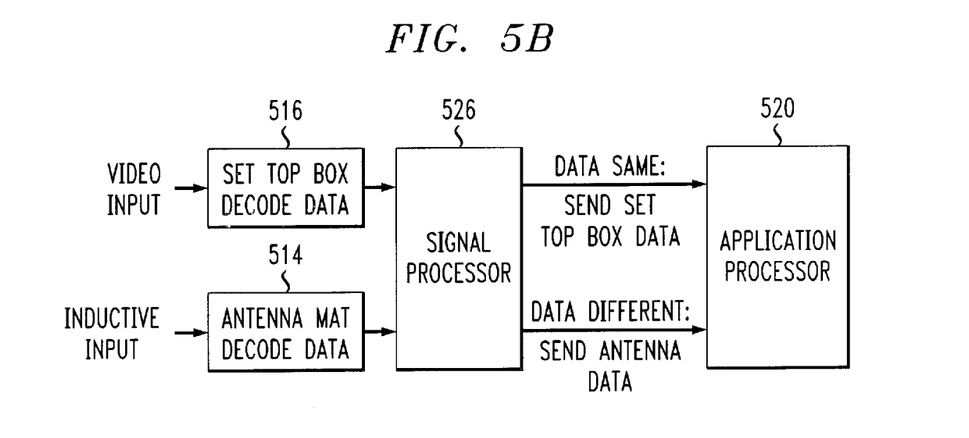
FIG. 5B is a flow diagram illustrating off-line data flow of decoded data before it is provided to a particular application.

In the off-line path, as shown in FIG. 5B, a signal processor 526 receives both sets of decoded data and compares the signals, as mentioned above with respect to the signal comparator 510. However, in addition, the signal processor 526 performs signal adaptation improvement techniques and/or error correction to improve and/or correct the selected signal before it is sent to the application processor 520. The application can also be adapted to accept only data that has been processed, or can trigger a change in the algorithm more quickly. Thus, with the off-line architecture (FIG. 5B), you assume that there is some process that is always available to modify the signal and improve it or do application error correction, while the real-time architecture (FIG. 5A) provides that a signal is always defaulted to the application itself.

Furthermore, in one embodiment of the invention, it is to be appreciated that some or all of the components illustrated in FIGS. 5A and 5B may be integrated in the set top box, including some or all of the components of the antenna mat, i.e., pick-up device.

Figure 6:
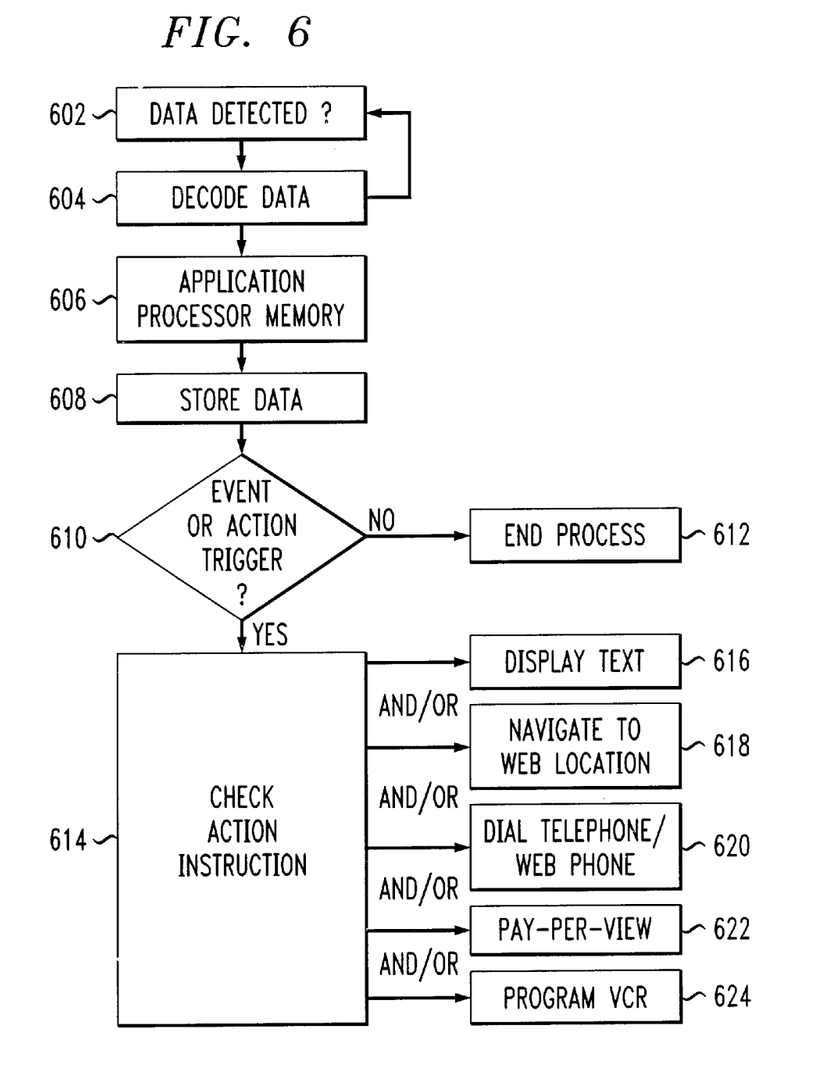
FIG. 6 is a flow diagram illustrating an application flow assuming only data decoded by an antenna mat according to the present invention.

Referring now to FIG. 6, a flow diagram is shown illustrating an illustrative application flow assuming only data decoded by the antenna mat is utilized. The initial process of the antenna mat is to determine if there is any data in the environment. The antenna mat is periodically woken up and listened to for data. Once the antenna mat detects data (step 602), it decodes the data and performs error correction processes (step 604), as mentioned above. The data is then moved into memory for use by an application process (steps 606 and 608). The application process has several triggering events or processes (step 610). The application is initiated in one of a number of ways including, for example, but not limited to: a scheduled event, an unscheduled event, a command input by a user, a remote control, a program coded instruction, etc. In the case of an event triggered by the data captured, a portion of the data packet might contain the instruction indicating the feature to be used by the application processor (step 612). Once the application process has been triggered, the process associated with the type of trigger is initiated.

If the process triggered is a command to display text, then the application processor selects the text from the data message or from memory and displays the text on the display portion of the system (step 616). It is to be appreciated that this may be the television monitor 150, or any other device coupled to the system with display capabilities (e.g., personal computer, personal digital assistant, etc.). Also, the application processor may cause the display of an image, display of subscription information (such as, for example, weather or sports scores), outputting of audio, and/or presentation of any other data provided from the pick-up device(s).

Figure 7:
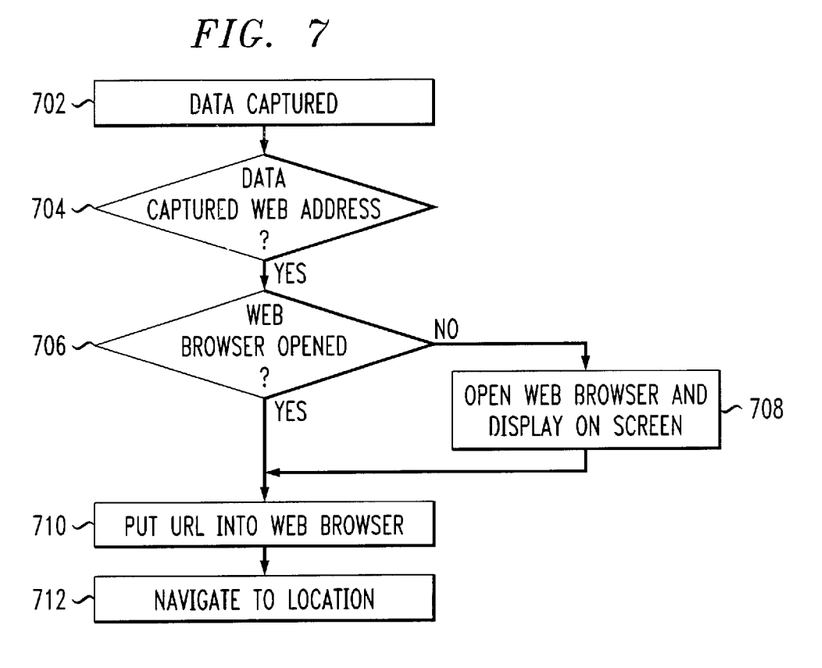
FIG. 7 is a flow diagram illustrating an application employing data decoded by an antenna mat according to the present invention.

If the packet received contains a web address, the web navigator may be triggered, then the text from the data packet may be transferred into the navigator window, and the navigation command may be executed providing a simultaneous viewing of a video program and an associated web site (step 618). FIG. 7 is a flow diagram illustrating such web navigation. Sub-process web navigation includes identification of the feature, web navigation, by the processor scanning the data packet decoded. Once the feature, web navigation, has been identified, the text portion of the data packet is identified as a web navigation instruction (step 702 and 704). The processor checks to determine if there is a web browser open on the target device (step 706). If a web browser is not open, the processor launches a web browser (step 708). If and when a web browser is opened, the text is transferred into the web browser (step 710), e.g., a uniform resource locator (URL) such as "furniture.com" may be put into the web browser. The processor triggers a navigation sequence to navigate to the location identified in the text transferred (step 712). Additional sub-processes may be utilized simultaneously or in sequence.

Another feature may identify a telephone number, web phone connection, etc. (step 620). The instructions and web address information is transmitted in whole or in part by means of the encoded data in the video stream which is being analyzed by the antenna mat (and/or a set top box). The data is decoded, and stored in memory and is accessed again by features associated with the service being provided to a consumer or business entity. Once the processor determines that a phone number, web phone instruction, or other real-time connection information has been transferred, and the process has been triggered, the dialing or connection instructions are transferred to the feature process. The process may be triggered in a number of ways including, for example, but not limited to: user scrolls through a list of stored items. These stored items are displayed on a display screen as on the display of a telephone handset. Once the user sees an item desired, he or she selects the item using a user interface such as a telephone keypad which may have a corresponding base station as in a cordless phone architecture (alternatives include: a remote control or telephone with additional features of a remote control, on-screen display and remote control, mouse, voice instruction, timing device, keypad, etc.). The cordless phone provides functions including, for example, but not limited to: wireless transfer of data between base station and hand held phone unit, dialing out, remote control for the television or other media device being used, etc. Once the item has been selected, the application processor uses the stored data to execute specific instructions such as to apply the captured and decoded telephone number to the corresponding dialing program. The call is placed as an automatically dialed call to the telephone number captured by the antenna mat and plugged into a feature application in the telephone device. The consumer simply scrolls through the numbers collect, selects one, and presses the button to execute the dialing instruction.

Another function that can be provided by this system includes pay-per-view (step 622). A consumer is watching television. A trailer for a film is played. The antenna mat captures and decodes and stores date/time/movie identification, appropriate telephone number (or alternatively, web address if the call center used by the pay-per-view company is a web call center), and associated text for display. The consumer selects the movie desired. A transaction is launched by the application processor. The path is identified, telephone or web, the dial string or web address is identified, the number is dialed automatically or the web site is accessed automatically, the detail data about the movie is automatically transferred to the application, and the consumer can continue to interact with the target system as desired.

VCR (video cassette recorder) Plus commands can be sent via video to the target device (step 624). Program advertisements can contain VCR Plus commands in the encoded data. The antenna mat picks up the VCR Plus information, along with text. The consumer can see the text portion of the data packet on a display device, on-screen, etc. The consumer can select to execute the VCR Plus command. The application processor launches a feature to take the numbers associated with the program desired and transfer them to the VCR at the appropriate time.

Of course, the above are merely examples of applications which may utilize data captured and decoded by the pick-up devices of the present invention. One of ordinary skill in the art will realize various other applications with which the teachings of the present invention may be employed.

Figure 8:
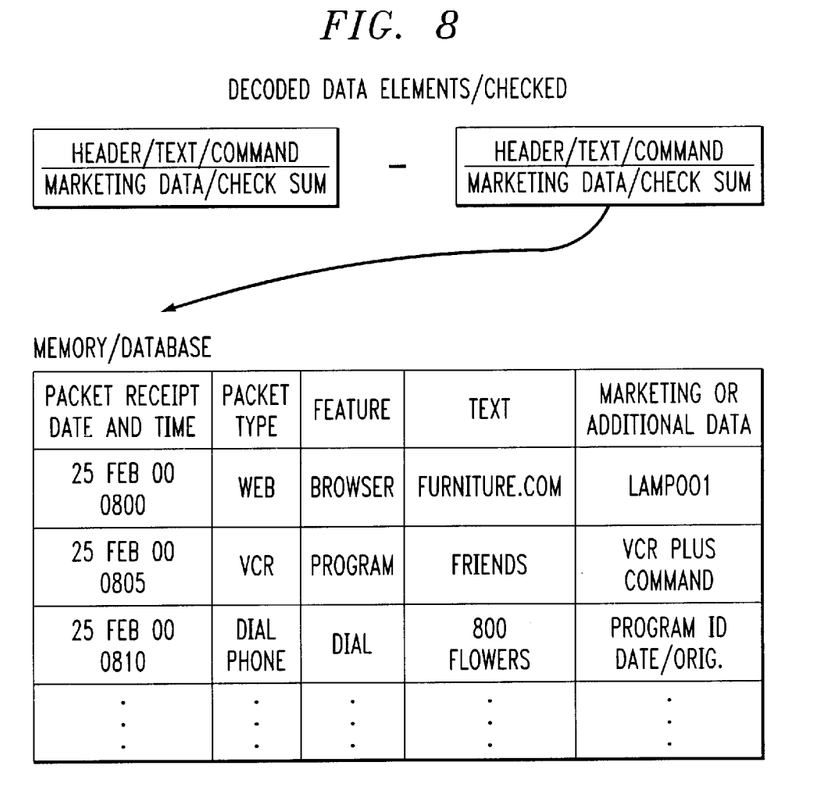
FIG. 8 is an illustration of encoded packets being stored in memory.

FIG. 8 is an illustration of encoded packets being stored in memory. First, a data packet is detected, decoded, and corrected by the antenna mat. Duplicate packets are eliminated. Updates to existing packets are transferred to memory. The data packet is transferred to memory. The memory can be part of the antenna mat, the set top box or any other associated device or system. A table of collected data packets is created as shown in FIG. 8. Program function is identified. Program functions may include, for example, but are not limited to: VCR Plus, Dialing the Phone, Navigating on the Web, Pay-Per-View Script, etc. Date and time stamps are added to the packets in memory (first column). Aging functions may be applied to data packets in memory as a service provider determines appropriate. Some packets may represent offers that expire, such as VCR Plus commands for programs to air at a certain time. Text to be displayed is identified from the packet (fourth column). Marketing data or additional transaction related data may be stored (fifth column) in the device and may be transmitted at the time of a transaction, or at the time of an inquiry. This will allow a vendor to use the same access point for multiple applications, and allow automatic navigation within the access point. The vendor will also be able to collect valuable information determining which advertisement, program, or incentive led to the transaction or inquiry.

It is to be appreciated that the present invention may be employed in accordance with the system described in U.S. Pat. No. 5,671,267 issued to August et al. On Sep. 23, 1997 and entitled "Interactive System for Communication Between a Cordless Telephone and a Remotely Operated Device," the disclosure of which is incorporated by reference herein. In the '267 patent, an interactive communication system is described which includes a portable unit of a cordless telephone for providing wireless telephone communications and integrating telephone functions and control of remotely operated devices, such as television sets, video cassette recorders and cable converters. The portable unit provides controlling information to a remotely operated device in response to voice and data communications occurring over the telephone network.

Figure 9:
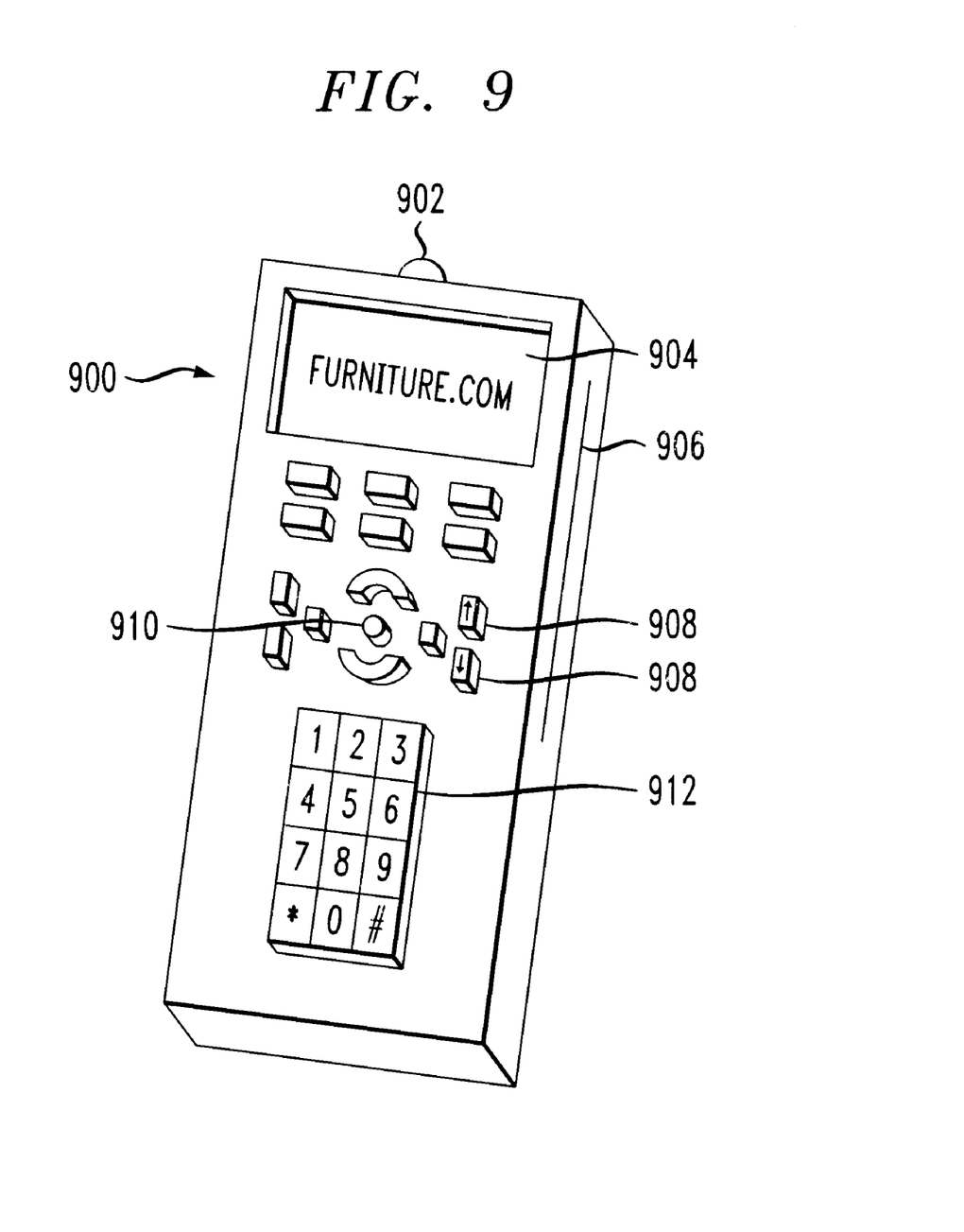
FIG. 9 is a diagram of a remote control which serves as a consumer user interface device enabling a user to manipulate data captured by an antenna mat according to the present invention within desired applications.

In a similar manner to that described in the '267 patent, the data captured and decoded in accordance with the antenna mat of the present invention may be employed in accordance with a remote control, a telephone with remote control features, a personal digital assistant, and/or a palmtop, etc. An example of such a remote control 900 is illustrated in FIG. 9. As shown, the remote control 900 includes an infrared (IF) transmitter/receiver 902, a display 904, a radio frequency (RF) transceiver 906, scrolling function buttons 908, selection function buttons 910 and a numeric keypad 912.

The remote control 900 serves as a consumer user interface device enabling the user to manipulate the data captured by the antenna mat within desired applications. The display 904 shows text describing the data captured and indicating functionality of the application. Buttons (e.g., 908, 910 and 912) provide selection capabilities to the consumer. In other devices, a mouse, voice or other methods may be used to make selections. Wireless links (IR and/or RF) are used to transmit data between a base station or set top box and the remote control 900 (or, for example, a telephone with remote control features or a palmtop type device). Specifically, such data may be transmitted between the remote control and the application processor.

During the process of a transaction, the display may change several times to indicate to the user the progress of the transaction. The display may indicate "navigation to the web site" is taking place. Then, the item desired may be displayed, then steps in the transaction may be displayed. Once the transaction is completed, a completion message may be displayed on the device. The consumer can decide to resume normal use of the device. The process of displaying transaction completion messages may be timed out at a predetermined interval.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A pick-up system for capturing and processing an information signal radiated from a display device located proximate to the pick-up device, the display device having a set top box associated therewith, the pick-up device comprising:

an antenna array arrangement including:
at least two antennas for respectively receiving emissions radiated from the display device;
at least two signal monitors, respectively coupled to the at least two antennas, for respectively detecting the information signal from the received emissions;
at least one of a diversity algorithm-based processing portion and an adaptive algorithm-based processing portion for analyzing the information signals detected by the at least two signal monitors and yielding an information signal for decoding by a decoder; and
a decoder for decoding an information signal received from at least one of the diversity algorithm-based processing portion and the adaptive algorithm-based processing portion;

a signal comparator, coupled to the antenna array arrangement and the set top box, for comparing a signal decoded by the antenna array arrangement and a signal decoded by the set top box; and an application processor, selectively coupled to the antenna array arrangement and the set top box, for receiving the decoded signal from the antenna array arrangement when the signal decoded by the antenna array arrangement and the signal decoded by the set top box are determined by the signal comparator to not be substantially similar, and receiving the decoded signal from the set top box when the signal decoded by the antenna array arrangement and the signal decoded by the set top box are determined by the signal comparator to be the substantially similar.

2. The system of claim 1, wherein the antenna array arrangement is integrated in the set top box.

3. The system of claim 1, wherein the application processor is operable to cause at least one of display of text, display of an image, display of subscription information, outputting of audio, navigation to a web location, dialing a phone number, accessing a pay-per-view service and programing equipment in accordance with the information signal captured from the display device.

* * * * *